United States Patent [19]
Stuzzi

[11] 3,916,121
[45] Oct. 28, 1975

[54] DICTAPHONE SYSTEM FOR MESSAGE CORRECTION

[75] Inventor: Viktor Stuzzi, Vienna, Austria

[73] Assignee: Radiotechnischer Betrieb Viktor Stuzzi, Vienna, Austria

[22] Filed: Oct. 9, 1973

[21] Appl. No.: 404,397

[30] Foreign Application Priority Data

Nov. 14, 1972 Austria ............................... 9679/72

[52] U.S. Cl. .......................... 179/100.1 DR; 360/13
[51] Int. Cl.[2] .......................................... G11B 27/02
[58] Field of Search .......................... 360/13, 63, 62; 179/100.1 DR

[56] References Cited

UNITED STATES PATENTS

| | | | |
|---|---|---|---|
| 2,805,862 | 9/1957 | Soubrier | 360/13 |
| 2,911,482 | 11/1959 | Dostert | 360/63 |
| 3,463,888 | 8/1969 | Yount | 179/100.1 DR |
| 3,632,893 | 1/1972 | Bolick, Jr. | 179/100.1 DR |
| 3,760,124 | 9/1973 | Gaven | 179/100.1 DR |

*Primary Examiner*—Stanley M. Urynowicz, Jr.
*Assistant Examiner*—David K. Moore
*Attorney, Agent, or Firm*—Ernest F. Marmorek

[57] ABSTRACT

In a dictaphone of the type having at least two parallel recording tracks including a main track for recording normal text and a secondary track for recording text corrections and amendments, the tracks being provided with separate recording channels to either of which a microphone or other source of sound-dependent voltage can be switched, there is provided means operative when the source of sound-dependent voltage is switched from the main track recording channel to the secondary track recording channel, to connect the main track recording channel simultaneously to a low frequency signalling device. Hence, a tone (preferably intermittent) is recorded on the main track whilst amendments are being recorded on the secondary track. The tone may be switched off automatically after a predetermined period following the start of recording on the secondary track.

11 Claims, 3 Drawing Figures

DICTAPHONE SYSTEM FOR MESSAGE CORRECTION

Figure 1:
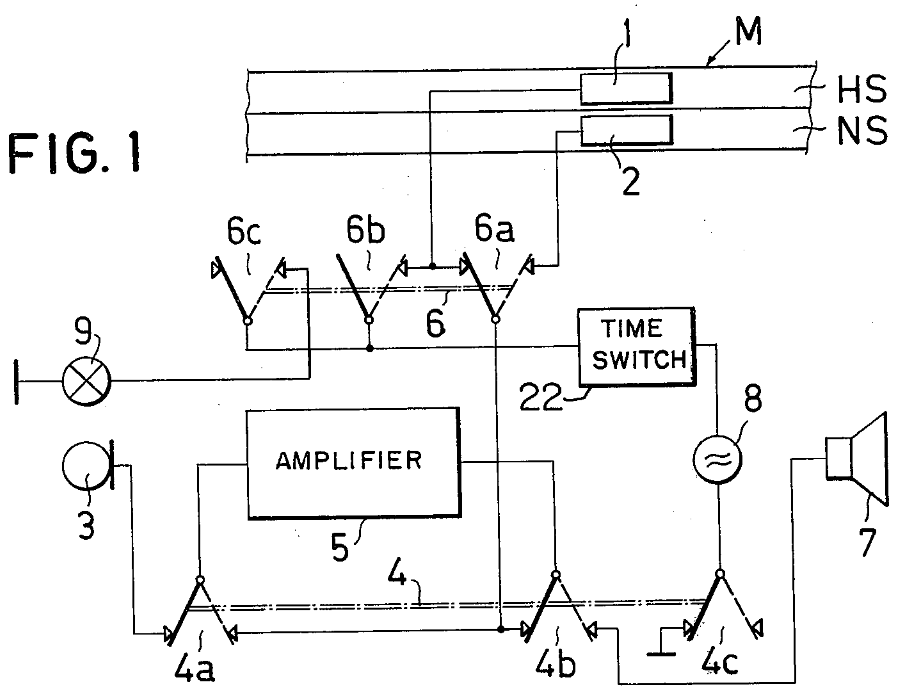

This invention relates to dictaphones of the type having at least two parallel recording tracks, in which one recording track (main track) is used for normal text and another recording track (secondary track) is used for text corrections and amendments, and in which these two tracks are provided with separate recording channels between which a source of sound-dependent voltage (e.g., a microphone) of the machine can be switched.

In known versions of such dictaphones which work on the magnetic sound-recording principle, the magnetic heads provided for the two tracks usually have to be switched on simultaneously for play-back so that the occasional presence of a recording on the secondary track can be observed, that is, by the two recordings overlapping when both the main and secondary tracks are listened to, so that they are difficult or even impossible to understand. When such overlapping of play-back occurs, the tape of the dictaphone can be spooled back to where the recording on the secondary track begins, and then the secondary track can be listened to on its own using only the secondary track magnetic head.

This method of indicating the beginning of a recording on the secondary track is not very successful or satisfactory, and the need for connecting both magnetic heads to the amplifier during play-back also causes an increase in the hum level.

According to the invention, an exact indication of the start of a recording on the secondary track, avoiding the requirement that normally the play-back channels for both recording tracks should be left switched on during replay, is achieved in a dictaphone of the type described by arranging that when the source of sound-dependent voltage is switched from the recording channel for the main track over to the recording channel for the secondary track, the recording channel for the main track can simultaneously be connected to an LF-signalling device, which preferably operates intermittently.

In this way, a signalling tone is recorded on the main track within the length of each recording on the secondary track, this being achieved with relatively little extra expense. This arrangement ensures that on listening to the recording on the main track, the particular place on the recording tape used from which the secondary track carries a recording can be determined very clearly and exactly. The frequency and amplitude of the LF-signalling tone which overlaps the text recording on the main track are selected so that on the one hand the signalling tone is clearly audible when the main track is listened to, but on the other hand the clarity of the normal text recorded on the main track is not significantly impaired by the overlapping signalling tone. Therefore, once the text correction or amendment on the secondary track has been listened to or carried out, the tape can be spooled back to the point where the recording on the secondary track begins, and the main track can again be listened to without undue impairment by the signalling tone.

The invention is applicable with various kinds of recording, and particularly with magnetic and stylus-recorded sound. The carrier of the recording may also be one of a variety such as tape, foil, discs, rigid cylinders or sleeves.

It is an advantage if the LF-signalling device is simultaneously with its connection to the recording channel for the main track, also connected to an optical and/or acoustic indicator, thereby making the user of the apparatus aware of the fact that text correction or amendment is in progress, by the action of, for example, a flasher or an intermittent sound in a loudspeaker.

The two recording channels are preferably also capable of connection with the amplifier of the apparatus as replay channels in a known manner. In magnetic sound recorders the magnetic heads have to be designed as combined record and replay heads for this purpose.

A change-over device for switching between the two recording channels and/or a change-over device for switching from recording to replay and/or the indicator for the LF-signalling device can be arranged on a hand microphone which serves as the source of sound-dependent voltage, and this results in a very simple single-handed operation.

If the dictaphone itself, or a replay device for replaying recordings made with the dictaphone, is intended to operate for the purpose of replay in a known manner by foot pedal control, it would be a disadvantage to take the leads coming from the playback channels of the main and secondary tracks via contacts of the foot pedal control. In this case the invention provides that switching-over between play-back channels, which is less prone to disturbance and at the same time free of clicks, becomes possible by connecting these play-back channels via separate preamplifiers to the amplifier of the dictaphone, or to a replay amplifier of the replay appliance, as the case may be. These pre-amplifiers are normally blocked or inoperative and leads are connected to the contacts of the foot pedal via which either gating signals or an operating voltage can be connected to the pre-amplifiers.

The foot pedal may have a back-spacer spring and may, in a first switch position, bring into action the pre-amplifier for the play-back channel of the main track and, in a second switch position, reached by increased pressure on the pedal and determined by a stop position, bring into action the pre-amplifier for the play-back channel of the secondary track, so that a change-over from listening to the main track to listening to the secondary track is effected simply by increased pressure on the pedal.

Figures 2, 3:
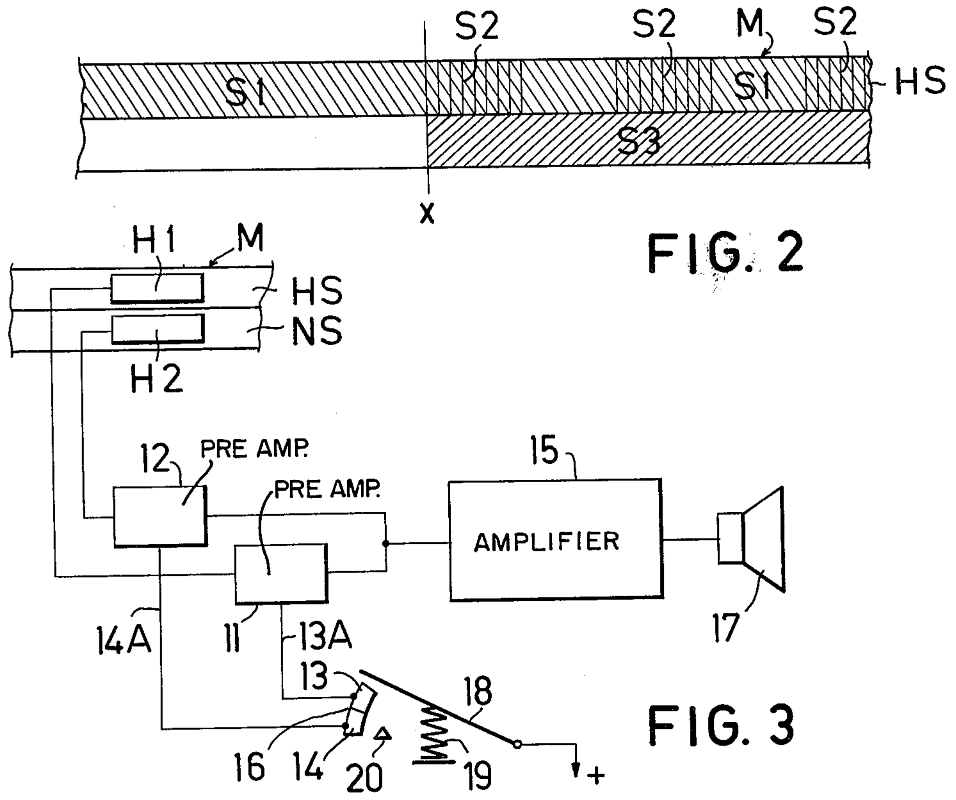

Embodiments of the invention will now be described, by way of example, with reference to the accompanying drawings, in which:

FIG. 1 shows in diagrammatic form the electrical circuits of a dictaphone according to the invention, which works on the magnetic tape principle, FIG. 2 shows in diagrammatic form the recording tracks obtained on a magnetic tape with this dictaphone, and FIG. 3 shows in digrammatic form a preferred version of a replay device with which the magnetic tape recordings made by use of the dictaphone can be played back.

The dictaphone shown in FIG. 1 has two magnetic heads 1 and 2 which are constructed as combined record and replay heads and of which one acts in conjunction with a main track HS and the other with a secondary track NS of a magnetic tape M with two parallel recording tracks. During a normal recording process, such as the recording of dictation, the magnetic head 1, acting as a record head, is connected to a microphone 3 via a change-over switch 4*a*, an amplifier 5, a change-over switch 4*b* and a change-over switch 6*a*, all of the switches mentioned above then being in the positions marked by full lines in FIG. 1. A recording is thereby made on the main track HS of the tape M as indicated in FIG. 2 by a hatching S1.

The switches 4*a* and 4*b* are mechanically coupled with each other and with a switch 4*c*, described below, to form a change-over device 4 for switching from recording to replay and vice versa. The switch 6*a* is mechanically coupled with switches 6*b* and 6*c*, described below, to form a change-over device 6 for switching from recording or replay by the main track HS to recording or replay by the secondary track NS.

If, after recording on the main track, an alteration or amendment of the text has to be made at a certain point of the recorded speech beginning, for example, at a point X of the tape M, as shown in FIG. 2, the tape is rewound on the dictaphone in the usual manner, which is not illustrated or described here, until the point X of the tape is positioned adjacent the magnetic heads 1 and 2. This point on the tape is located in the usual way by setting the dictaphone in the replay condition by operating the change-over device 4. This means that the magnetic head 1, acting as a replay head, is now connected to the input of the amplifier 5 via the change-over switches 6*a* and 4*a*. The output of the amplifier 5 is fed to a loudspeaker or headphone 7 via the change-over switch 4*b*.

After correct positioning of the tape M, the change-over switching device 4 is again switched to the record position and at the same time the change-over device 6 is operated, resulting in the switchs 6*a*, 6*b* and 6*c* being switched over. The magnetic head 2, instead of the head 1, is therefore connected, via the switch 6*a*, to the amplifier 5, and operates as a record head. A signalling device 8, which intermittently produces low-frequency signals, is connected via the switch 6*b* to the head 1. This signalling device may be an LF-oscillator adjusted by a flip-flop.

By connecting the signalling device 8 to the magnetic head 1, an intermittent tone is made to overlap with the recording S1 in FIG. 2 on the main track HS, as indicated by hatched areas S2.

The alteration or amendment of the text designed to fit in at the section starting at the point X is now spoken, via the microphone 3, with the magnetic head 2 acting as a record head, and is thereby recorded on the secondary track NS, as indicated in FIG. 2 by hatching S3, the recording beginning at the point X of the tape and being accompanied over its entire length on the main track HS by the intermittent tone represented by hatched areas S2. It may be advisable to provide a time switch 22, preferably electronic, in circuit relationship with the signalling device 8 and which after a certain period automatically disconnects the signalling device 8 from the magnetic head 1, so that the intermittent tone is recorded on the main track only during the first part of the period of recording on the secondary track.

Whilst speech is being recorded on the track NS of the tape M for the purpose of correcting or amending the text, the switch 6*c* of the change-over device 6 causes a small lamp 9 to be connected to the LF-generator 8 so that the lamp flashes with the scanning frequency of the generator and serves to remind the operator that the dictaphone is not set on normal operation. This lamp 9 or another optical or acoustic indicator and/or the change-over devices 4 and/or 6 can be built-in with a hand microphone if such is used; this simplifies the operation of the dictaphone for the user.

FIG. 3 shows an advantageous version of a "replay only" apparatus for recordings as illustrated in FIG. 2 made with a dictaphone as shown in FIG. 1. This replay apparatus has two play-back heads H1 and H2 which are connected via separate amplifiers 11 and 12, respectively, to a play-back amplifier 15 to the output of which is connected a headphone or loudspeaker 17. Preferably the replay apparatus should operate by foot pedal control, as is desirable for typing a recorded dictation by listening to it. For this purpose a foot pedal 18 is provided which can be depressed against the action of a return spring 19. In a first switch position of the pedal, connection is made with a contact 13, thereby applying a voltage via a lead 13A, to energise the pre-amplifier 11 for the play-back head H1. By increasing the pressure on the pedal, it can be moved to a second switch position in which connection is made with a contact 14 which is separated by an insulating layer 16 from the contact 13. The furthest position of the foot pedal is determined by a stop 20. When the foot pedal is in the above-mentioned second switch position, the working voltage is connected via a lead 14A to the pre-amplifier 12 for the play-back head H2, so that now this head, instead of the head H1, is connected to the amplifier 15. This means that the text corrections and amendments recorded on the secondary track HS can be heard.

The devices described with reference to the accompanying drawings are, of course, equipped with the usual controls (not shown) for forward and reverse spooling of the recording carrier; but these are well known and need no description.

I claim:

1. A dictaphone comprising a common carrier having at least two parallel recording tracks thereon including a main track for recording normal text and a secondary track for recording text corrections and amendments, said main and secondary tracks being provided with separate recording channels to either of which a source of sound-dependent voltage can be switched, the dictaphone further including switching means operative when the source of sound-dependent voltage is switched from the main track recording channel to the secondary track recording channel for connecting the main track recording channel simultaneously to a low frequency signalling device for recording a warning signal over a portion of said main track.

2. A dictaphone according to claim 1, in which the signalling device operates intermittently.

3. A dictaphone according to claim 1, in which the signalling device is connected to an optical and/or acoustic indicator simultaneously with its connection to said main track recording channel.

4. A dictaphone according to claim 1, including time switch means connected in circuit relationship with said signalling device, for automatically disconnecting the signalling device from the main track recording channel after a preset period following its connection.

5. A dictaphone according to claim 4, in which the time switch means is electronic.

6. A dictaphone according to claim 1, including a record/play-back amplifier; two heads; and change-over switching means for connecting the heads to said record/play-back amplifier in a first mode in which they operate as recording heads and in a second mode in which they operate as play-back heads.

7. A dictaphone according to claim 6, in which means for switching the sound-dependent voltage source between the recording channels and/or the change-over switching means for changing from recording to replay and/or indicator means for indicating that the signalling device is connected to the main track recording channel are arranged on a hand microphone which serves as the source of sound-dependent voltage.

8. A dictaphone according to claim 1, in which replay heads for the main and secondary tracks are connected via separate pre-amplifiers to a play-back amplifier, said pre-amplifiers being normally blocked or inoperative, and in which a foot pedal switch is operable to apply signals to the pre-amplifiers for unblocking or energizing the pre-amplifiers.

9. A dictaphone according to claim 8, in which the foot pedal switch applies said unblocking or energising signal to the pre-amplifier for the replay head of the main track at a first switch position and applies said unblocking or energising signal to the pre-amplifier for the replay head of the secondary track at a second switch position reached by increased pressure on the foot pedal.

10. A replay device for replaying recordings made with a dictaphone according to claim 1, in which replay heads for the main and secondary tracks are connected via separate pre-amplifiers to a play-back amplifier, said pre-amplifiers being normally blocked or inoperative, and in which a foot pedal switch is operable to apply signals to the pre-amplifiers for unblocking or energizing the pre-amplifiers.

11. A device according to claim 10, in which the foot pedal switch applies said unblocking or energising signal to the pre-amplifier for the replay head of the main track at a first switch position and applies said unblocking or energizing signal to the pre-amplifier for the replay head of the secondary track at a second switch position reached by increased pressure on the foot pedal.

* * * * *

UNITED STATES PATENT AND TRADEMARK OFFICE

CERTIFICATE OF CORRECTION

PATENT NO. : 3,916,121

DATED : October 28, 1975

INVENTOR(S) : Viktor Stuzzi

It is certified that error appears in the above-identified patent and that said Letters Patent are hereby corrected as shown below:

IN THE TITLE:

Change "DICTAPHONE" to --DICTATING MACHINE--;

IN THE ABSTRACT:

Line 1, change "dictaphone" to --dictating machine--.

Column 1, line 1, change "DICTAPHONE" to --DICTATING MACHINE--;

line 5, change "dictaphones" to --dictating machines--;

line 14, change "dictaphones" to --dictating machines--;

line 23, change "dictaphone" to --dictating machine--;

line 36, change "dictaphone" to --dictating machine--;

Column 2, line 20, change "dictaphone" to --dictating machine--;

UNITED STATES PATENT AND TRADEMARK OFFICE

CERTIFICATE OF CORRECTION

PATENT NO. : 3,916,121

DATED : October 28, 1975

INVENTOR(S) : Viktor Stuzzi

It is certified that error appears in the above-identified patent and that said Letters Patent are hereby corrected as shown below:

Column 2, line 21, change "dictaphone" to --dictating machine--;

line 31, change "dictaphone" to --dictating machine--;

line 51, change "dictaphone" to --dictating machine--;

lines 54 and 55, change "dictaphone" to --dictating machine--;

line 58, change "dictaphone" to --dictating machine--;

line 60, change "dictaphone" to --dictating machine--;

Column 3, line 18, change "dictaphone" to --dictating machine--;

line 22, change "dictaphone" to --dictating machine--;

UNITED STATES PATENT AND TRADEMARK OFFICE

CERTIFICATE OF CORRECTION

PATENT NO. : 3,916,121

DATED : October 28, 1975

INVENTOR(S) : Viktor Stuzzi

It is certified that error appears in the above-identified patent and that said Letters Patent are hereby corrected as shown below:

Column 3, line 66, change "dictaphone" to --dictating machine--;

Column 4, line 2, change "dictaphone" to --dictating machine--;

line 5, change "dictaphone" to --dictating machine--;

line 36 (Claim 1, line 1) change "dictaphone" to --dictating machine--;

lines 42 and 43 (Claim 1, lines 7 and 8) change "dictaphone" to --dictating machine--;

line 50 (Claim 2, line 1) change "dictaphone" to --dictating machine--;

line 52 (Claim 3, line 1) change "dictaphone" to --dictating machine--;

line 56 (Claim 4, line 1) change "dictaphone" to --dictating machine--;

UNITED STATES PATENT AND TRADEMARK OFFICE
CERTIFICATE OF CORRECTION

PATENT NO. : 3,916,121

DATED : October 28, 1975

INVENTOR(S) : Viktor Stuzzi

It is certified that error appears in the above-identified patent and that said Letters Patent are hereby corrected as shown below:

Column 4, line 61, (Claim 5, line 1) change "dictaphone" to --dictating machine--;

line 63, (Claim 6, line 1) change "dictaphone" to --dictating machine--;

Column 5, line 1, (Claim 7, line 1) change "dictaphone" to --dictating machine--;

line 9, (Claim 8, line 1) change "dictaphone" to --dictating machine--;

line 16, (Claim 9, line 1) change "dictaphone" to --dictating machine--;

Column 6, line 6 (Claim 10, line 2) change "dictaphone" to --dictating machine--;

Signed and Sealed this

Fourteenth Day of September 1976

[SEAL]

*Attest:*

RUTH C. MASON
*Attesting Officer*

C. MARSHALL DANN
*Commissioner of Patents and Trademarks*